(12) United States Patent
Olson et al.

(10) Patent No.: US 10,601,464 B2
(45) Date of Patent: Mar. 24, 2020

(54) WELLSITE SYSTEM AND METHOD FOR MULTIPLE CARRIER FREQUENCY, HALF DUPLEX CABLE TELEMETRY

(71) Applicant: Schlumberger Technology Corporation, Sugar Land, TX (US)

(72) Inventors: Alex Olson, Houston, TX (US); Nalin Weerasinghe, Sugar Land, TX (US); Kun Wang, West Windsor, NJ (US); Milos Milosevic, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/371,849

(22) Filed: Apr. 1, 2019

(65) Prior Publication Data

US 2019/0229767 A1 Jul. 25, 2019

Related U.S. Application Data

(63) Continuation of application No. 13/705,130, filed on Dec. 4, 2012, now abandoned.

(51) Int. Cl.
*H04B 3/32* (2006.01)
*H04B 3/23* (2006.01)
*G01V 11/00* (2006.01)

(52) U.S. Cl.
CPC ........... *H04B 3/32* (2013.01); *H04B 3/23* (2013.01); *G01V 11/002* (2013.01)

(58) Field of Classification Search
CPC .............. G01V 3/18; H04B 3/23; H04B 3/32
(Continued)

(56) References Cited

U.S. PATENT DOCUMENTS 3,707,700 A 12/1972 Lafont
4,597,073 A 6/1986 Staples
(Continued)

FOREIGN PATENT DOCUMENTS

EP 2194227 A2 6/2010
GB 2393364 A 3/2004
(Continued)

OTHER PUBLICATIONS

Chayer, "Tutorial on TDD Systems", Dec. 3, 2001, FCC Office of Engineering and Technology, Slide 5 (103 pages).
(Continued)

*Primary Examiner* — Omar Casillashernandez
(74) *Attorney, Agent, or Firm* — Eileen Pape

(57) ABSTRACT

Methods and systems for multiple carrier frequency, half duplex cable telemetry for a wellsite. The methods involve generating a first type of bi-directional message in a first propagation mode, generating a second type of bi-directional message in the first propagation mode and in a second propagation mode, transmitting over a cable operatively coupling a surface modem and a downhole modem the first and second types of bi-directional message sequentially in a plurality of time periods across a single frequency bandwidth, and separating each of the first and second types of bi-directional message from a most subsequently transmitted one of the first and second types of bi-directional message by a quiet time sample during which no message is transmitted.

17 Claims, 14 Drawing Sheets

(58) Field of Classification Search
USPC ......... 340/853.1, 853.7, 854.3–855.2, 855.3, 340/855.7
See application file for complete search history.

(56) References Cited

U.S. PATENT DOCUMENTS

| | | | |
|---|---|---|---|
| 4,905,234 A | | 2/1990 | Childress et al. |
| 5,191,326 A | | 3/1993 | Montgomery |
| 5,331,318 A | | 7/1994 | Montgomery |
| 5,592,438 A | | 1/1997 | Rorden et al. |
| 5,719,883 A | | 2/1998 | Ayanoglu |
| 5,784,004 A | | 7/1998 | Esfahani et al. |
| 5,838,727 A | | 11/1998 | Lyon et al. |
| 5,995,449 A | | 11/1999 | Green et al. |
| 6,061,633 A | | 5/2000 | Fukuhara et al. |
| 6,175,599 B1 | | 1/2001 | Lyon et al. |
| 6,252,518 B1 | | 6/2001 | Laborde |
| 6,310,559 B1 | | 10/2001 | Laborde et al. |
| 6,519,568 B1 | | 2/2003 | Harvey et al. |
| 6,552,665 B1 | * | 4/2003 | Miyamae ................ E21B 47/12 340/854.9 |
| 6,580,751 B1 | | 6/2003 | Gardner et al. |
| 6,628,992 B2 | | 9/2003 | Osburn, III |
| 6,657,551 B2 | | 12/2003 | Huckaba et al. |
| 6,747,569 B2 | | 6/2004 | Hill et al. |
| 6,778,622 B2 | | 8/2004 | Bombay |
| 6,999,517 B1 | | 2/2006 | Bombay et al. |
| 7,026,952 B2 | | 4/2006 | Krueger |
| 7,042,367 B2 | | 5/2006 | Gardner et al. |
| 7,081,831 B2 | | 7/2006 | Dodge |
| 7,096,961 B2 | | 8/2006 | Clark et al. |
| 7,132,958 B2 | | 11/2006 | Dodge et al. |
| 7,181,515 B2 | | 2/2007 | Lin et al. |
| 7,193,525 B2 | | 3/2007 | Miyamae et al. |
| 7,394,752 B2 | | 7/2008 | Hasegawa et al. |
| 7,443,312 B2 | | 10/2008 | Quintero et al. |
| 7,480,207 B2 | | 1/2009 | Marsh |
| 7,787,525 B1 | * | 8/2010 | Clark, Jr. ............ H04L 27/2608 340/855.4 |
| 8,217,802 B2 | | 7/2012 | Weerasinghe |
| 2002/0178295 A1 | | 11/2002 | Buczek et al. |
| 2004/0105405 A1 | * | 6/2004 | Botzel ................. H04B 7/2656 370/321 |
| 2004/0155794 A1 | | 8/2004 | Gardner |
| 2004/0156264 A1 | | 8/2004 | Gardner et al. |
| 2005/0046592 A1 | | 3/2005 | Cooper et al. |
| 2010/0085901 A1 | | 4/2010 | Womack et al. |
| 2010/0194586 A1 | | 8/2010 | Tjhang et al. |
| 2010/0295702 A1 | | 11/2010 | Zhao et al. |
| 2011/0005835 A1 | | 1/2011 | Li |
| 2013/0136041 A1 | * | 5/2013 | Hoymann ............. H04W 24/02 370/280 |
| 2013/0136108 A1 | | 5/2013 | Cheng et al. |
| 2014/0010328 A1 | | 1/2014 | Ljung et al. |
| 2014/0152457 A1 | | 6/2014 | Nishisaka et al. |
| 2014/0152459 A1 | | 6/2014 | Olson et al. |

FOREIGN PATENT DOCUMENTS

| | | | | |
|---|---|---|---|---|
| GB | 2408432 A | * | 5/2005 | ........... E21B 47/122 |
| GB | 2408432 A | | 5/2005 | |
| WO | 0149001 A1 | | 7/2001 | |
| WO | WO-0149001 A1 | * | 7/2001 | ........... E21B 47/122 |
| WO | 2001095517 | | 12/2001 | |
| WO | 2008005054 A2 | | 1/2008 | |

OTHER PUBLICATIONS

Extended Search Report issued in the related EP Application 13195181.6, dated Nov. 18, 2016 (7 pages).

\* cited by examiner

T5 Schedule
| 1 T5 DL Fr | 50 T5 Quiet Samples | 36 T5 UL Fr | 50 T5 Quiet Samples |
|---|---|---|---|
T7 Schedule
| Quiet Fr | 50 T5 Quiet Samples | 36 T7 UL Fr | 50 T7 Quiet Samples |
|---|---|---|---|
*FIG. 12*
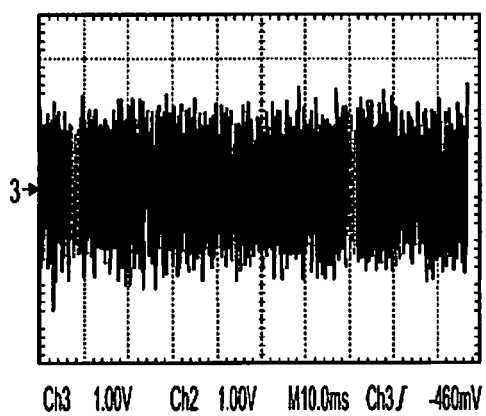
*FIG. 13-1*
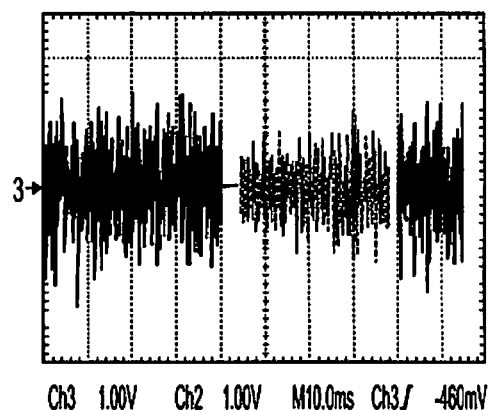
*FIG. 13-2*

WELLSITE SYSTEM AND METHOD FOR MULTIPLE CARRIER FREQUENCY, HALF DUPLEX CABLE TELEMETRY

CROSS-REFERENCE TO RELATED APPLICATION

This Application is a continuation application of co-pending U.S. patent application Ser. No. 13/705,130, entitled: "Wellsite System and Method for Multiple Carrier Frequency, Half Duplex Cable Telemetry," filed on Dec. 4, 2012, the entirety of which is incorporated herein by reference.

BACKGROUND

The following descriptions and examples are not admitted to be prior art by virtue of their inclusion in this section.

Hydrocarbon fluids, such as oil and natural gas, may be obtained from a subterranean geologic formation, referred to as a reservoir, by drilling a well that penetrates a hydrocarbon-bearing formation. A variety of downhole tools may be used in various areas of oil and natural gas services. In some cases, downhole tools may be used in a well for surveying, drilling, and production of hydrocarbons. The downhole tools may communicate with the surface via various telemetry systems. In some cases, the downhole tools may comprise one or more individual modules in operative communication with one another, such as a master module and multiple slave modules. Examples of communication systems are provided in U.S. Patent/Application Nos. 6,628,992, 7,181,515, and 20020178295.

With the increased precision of downhole tools and sensors, relatively shorter time may be available to send increasingly larger amounts of data. In addition to new modules and assemblies being developed for downhole use on a continuing basis, tool bus systems may facilitate communication between older and newer generation modules in order to obtain the maximum service life from existing modules.

Applications of disclosed embodiments of the present disclosure are not limited to these illustrated examples, different industrial applications may benefit from implementations of the following disclosure.

SUMMARY

In at least one aspect, the disclosure relates to a method for multiple carrier frequency, half duplex cable telemetry. The method can include generating a first type of bi-directional message in a first propagation mode. The method can include generating a second type of bi-directional message in the first propagation mode and a second propagation mode. The method can include transmitting the first and second types of bi-directional messages over a cable operatively coupling a surface modem and a downhole modem sequentially in a plurality of time periods across a single frequency bandwidth. The method can include separating each of the first and second types of bi-directional messages from the most subsequently transmitted message by a quiet time sample during which no message is transmitted.

In at least one aspect, the disclosure relates to a system for multiple carrier frequency, half duplex cable telemetry. The system can include a surface modem that generates one or more downlink messages in a first propagation mode. The system can include one or more downhole tools that obtain measurements relating to one of borehole characteristics and formation characteristics, the downhole tools coupled by a toolbus to a downhole modem. The downhole modem generates one or more uplink messages in the first propagation mode and a second propagation mode. The system can include a cable electrically coupling the surface modem and the downhole modem. The one or more downlink messages and the one or more uplink messages are transmitted over the cable sequentially in a plurality of time periods across a single frequency bandwidth, each of the downlink and uplink messages separated from the most subsequently transmitted message by a quiet time sample during which no message is transmitted.

In at least one aspect, the disclosure relates to a wellsite system for multiple carrier frequency, half duplex cable telemetry. The wellsite system can include a surface acquisition unit including a surface modem that generates one or more downlink messages in a first propagation mode. The wellsite system can include a downhole modem that generates one or more uplink messages in the first propagation mode and a second propagation mode. The wellsite system can include a downhole tool string including one or more downhole sensing tools that obtain measurements relating to one of borehole characteristics and formation characteristics. The downhole tool string may be operatively coupled to the downhole modem via a toolbus. The wellsite system can include a cable electrically coupling the surface modem and the downhole modem. The one or more downlink messages and the one or more uplink messages may be transmitted sequentially in a plurality of time periods across a single frequency bandwidth, each of the downlink and uplink messages separated from the most subsequently transmitted message by a quiet time sample during which no message is transmitted.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Embodiments of systems, apparatuses, and methods for multi-carrier frequency, half duplex cable telemetry are described with reference to the following figures. Like numbers are used throughout the figures to reference like features and components.

FIGS. 3-1 through 3-3 are schematic diagrams illustrating end views of a wireline heptacable in accordance with an embodiment of the present disclosure.

FIG. 12 is a schematic diagram illustrating a time-domain diagram of uplink and downlink frames in a half duplex architecture in accordance with an embodiment of the present disclosure.

FIGS. 13-1 and 13-2 are graphs illustrating oscilloscope captures of uplink frames and downlink frame in accordance with an embodiment of the present disclosure.

FIGS. 14-1 and 14-2 are graphs illustrating a shortened and an unshortened ECHO impulse response after and before TEQ respectively in accordance with an embodiment of the present disclosure.

DETAILED DESCRIPTION

In the following description, numerous details are set forth to provide an understanding of the present disclosure. However, it will be understood by those skilled in the art that the present disclosure may be practiced without these details and that numerous variations or modifications from the described embodiments are possible.

The disclosure relates to cable telemetry for a wellsite. The cable telemetry may enable data reception from tools and send data commands to downhole tools via, for example, a wireline heptacable. "Cable telemetry" refers generally to communication between an uphole modem and a downhole modem over a cable.

Multi-Carrier Frequency, Half Duplex Cable Telemetry Overview

Figure 1:
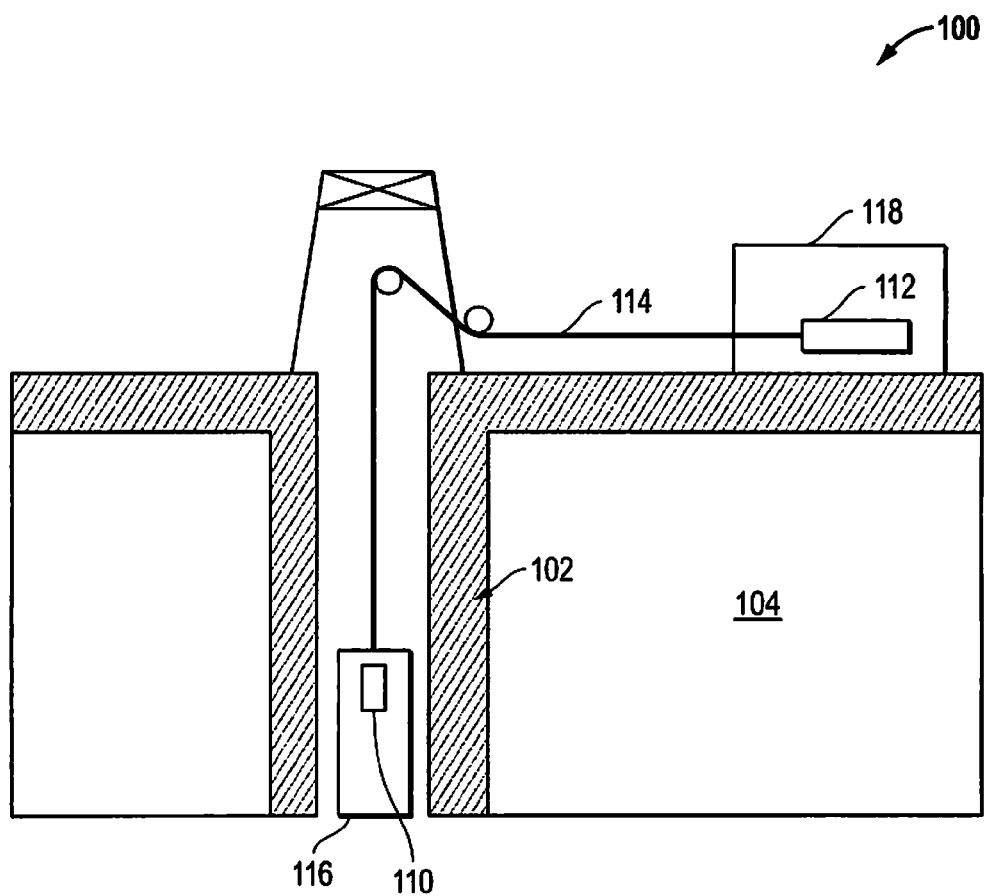
FIG. 1 is a schematic representation illustrating a wellsite with a borehole traversing a subsurface formation and having a system for multiple carrier frequency, half duplex cable telemetry in accordance with an embodiment of the present disclosure.

Referring to FIG. 1, an example wireline logging operation is illustrated with respect to the wellsite system 100 employed in a wellbore 102 traversing a subsurface formation 104. A downhole telemetry cartridge 110 is connected to a toolstring 116. In a well-logging operation, a plurality of tools (e.g., 230, 230', etc. of FIG. 2) may be connected in the toolstring 116. The tools of the toolstring 116 communicate with the downhole telemetry circuits of downhole telemetry cartridge 110 via a bi-directional electrical interface.

In some embodiments, the tools of the toolstring 116 may be connected to the telemetry cartridge 110 over a common data bus. In some embodiments, each tool of the toolstring 116 may be individually, directly connected to the telemetry cartridge 110. In one embodiment, the telemetry cartridge 110 may be a separate unit, which is mechanically and electrically connected to the tools in the toolstring 116. In one embodiment, the telemetry cartridge 110 may be integrated into a housing of one of the well-logging tools 116.

The telemetry cartridge 110 is operatively coupled to a wireline cable 114. The tools of the toolstring 116, including the telemetry cartridge 110, may be lowered into the wellbore 102 on the wireline cable 114.

A surface data acquisition computer 118 is located at the surface end of the wireline cable 114. The surface data acquisition computer 118 includes or couples to an uphole telemetry unit 112. The data acquisition computer 118 may provide control of the components in the toolstring 116 and process and store the data acquired downhole. The acquisition computer 118 may communicate with the uphole telemetry unit 112 via a bi-directional electrical interface.

The uphole telemetry unit 112 may modulate downlink commands from the acquisition computer 118 for transmission down the cable 114 to the toolstring 116, and demodulates uplink data from the toolstring 116 for processing and storage by the surface data acquisition computer 118.

The downhole telemetry cartridge 110 contains circuitry to modulate uplink data from the tools of the toolstring 116 for transmission up the wireline cable 114 to the surface data acquisition computer 118 and to demodulate downlink commands or data from the surface data acquisition computer 118 for the tools of the toolstring 116.

Figure 2:
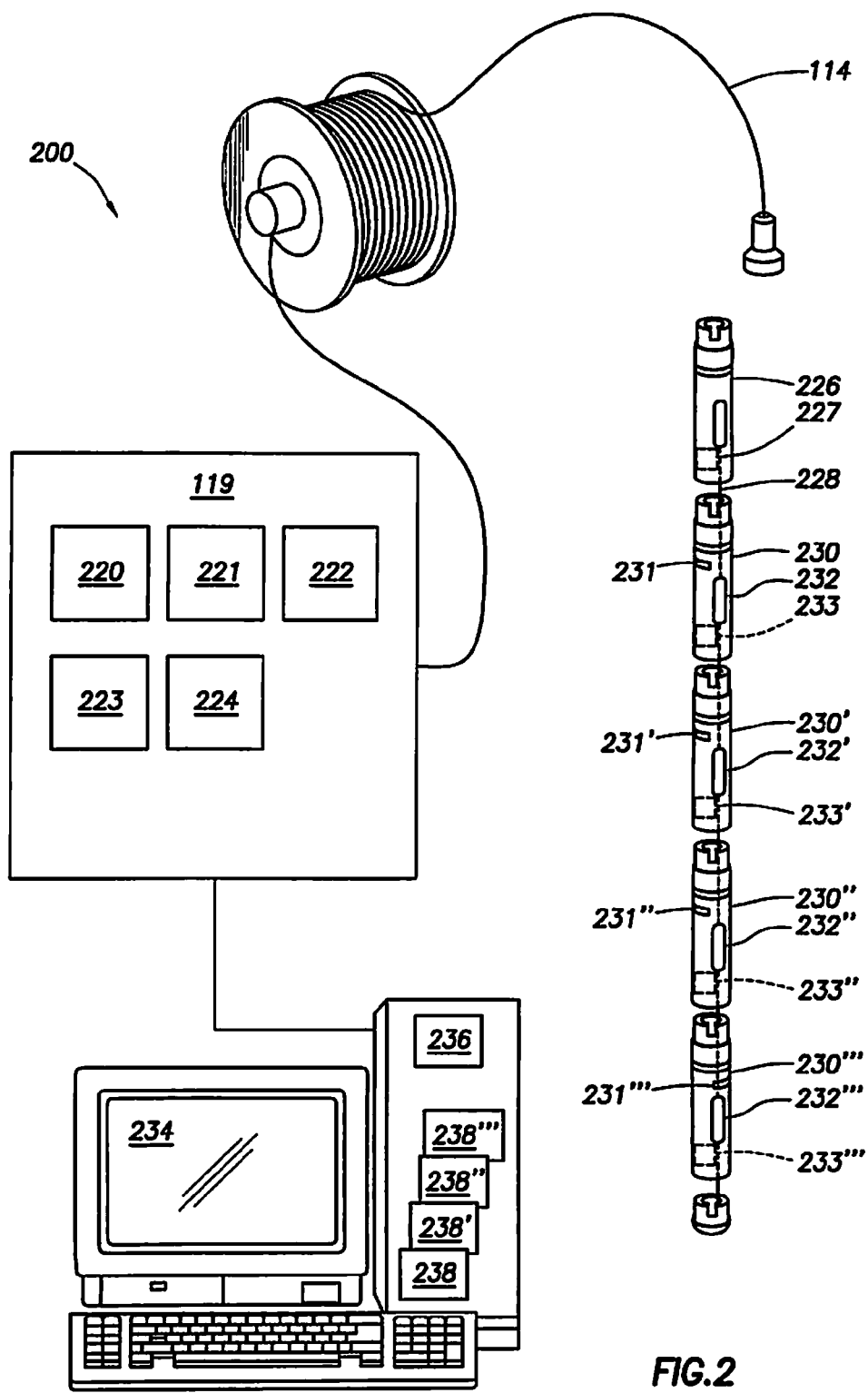
FIG. 2 shows a block diagram illustrating an example system for multiple carrier frequency, half duplex cable telemetry in accordance with an embodiment of the present disclosure.

A more detailed schematic view of an example cable telemetry system 200 is shown in FIG. 2. The cable telemetry system 200 shown includes a surface acquisition module/surface modem (DTM) 220 having a telemetry interface module (TIM) 222, which can be located at the surface as a portion of or operatively coupled to the surface data acquisition front end 119 (a component of surface data acquisition computer 118 of FIG. 1). The front end 119 may be, for example, eWAFE™ commercially available from SCHLUMBERGER™ (see: www.slb.com).

The surface data acquisition front end 119 is coupled to the wireline cable 114, and a downhole modem (DTC) 226 (as a portion of the downhole telemetry cartridge 110 at the head of the toolstring 116 of FIG. 1). The tool string 116 includes a number of downhole tools, 230, 230', 230", 230"', etc. The downhole tools 230, 230', etc., each containing a respective interface package, 232, 232', 232", 232"', etc., through which they are in communication with the DTC 226 via a tool bus 228. The downhole tools 230, 230', 230", 230"', etc. may also have tool node controllers 233, 233', 233", 233"', etc., respectively.

The cable telemetry system 200 may handle data flows in opposite directions (i.e., from the tools 230, 230', etc.) via the respective node and the tool bus 228. The flow extends to the DTC 226 to the DTM 220 over the cable 114 ("uplink"), and the reverse direction from the DTM 220 to the DTC 226 and tools 230, 230', etc., over the same path ("downlink"). The cable telemetry system 200 provides a communication path from the tools, 230, 230', etc., to the DTM 220 of the data acquisition computer 118 so that data acquired by sensors 231, 231', 231", 231"', etc. of the downhole tools 230, 230', etc. can be processed and analyzed at the surface, as well as communication between tools 230, 230', etc.

Each individual tool (230, 230', etc.) may include a node command buffer (not shown) at the interface package 232, 232', etc., as well as a logic controller of its own (not shown). The surface acquisition front-end unit 119 may also include various additional components, such as a power module 221, a depth and tension module 223, and a flow controller software module (FEPC) 224.

The downhole telemetry cartridge 226 can include a downhole master node controller 227 that may examine packets sent by each respective tool 230, 230', etc. Data communicated in either direction may be copied and buffered at the master node controller 227, and sent to the recipient.

A surface computer 234 can store and execute a surface data dispatcher module 236 (which may be, in an embodiment, a software data routing module, such as SCHLUMBERGER's™ MAXWELL™ framework). The surface computer 234 can also store and execute a plurality of surface tool-specific applications 238, 238', 238'', 238''', etc. that analyze and use data obtained, respectively, by tools 230, 230', etc.

The wireline cable 114 may be a monocable, coaxial cable, or a multi-conductor cable, such as a heptacable. Embodiments may extend to wired drill pipe or in a system that uses a single insulated conductor (wire) and borehole casing as a system. In construction, the monocable may have a single conductor with a return on the armor of the wires, while the coaxial cable can have a single conductor with a return on the serve around it isolated from the armor.

Heptacables may contain several electrical conductors, for example, seven wires. The outer armor, for example, may have a center conductor with six conductors wound helically around the center conductor. Data may be simultaneously transmitted on these several conductors. The distinct combinations of conductors used in heptacable or other multi-conductor cables are referred to herein as "propagation modes."

Cross-talk between several propagation modes, when in use simultaneously, can be a source of noise in data transmission. "Far-end cross-talk" is the interference between data transmitted in a propagation mode and data transmitted in another propagation mode. Far-end cross-talk can be caused, for example, by imperfections in the symmetry or insulation of the wireline cable, as well as circuitry that is used for interfacing to the cable downhole and at the surface. Far-end cross-talk can impact both data rate and robustness of the data transmission. Cross-talk may limit the available data rate and reliability. For example, cross-talk can lead to transmission failures during the progress of a logging job.

Figures 1, 2, 3:
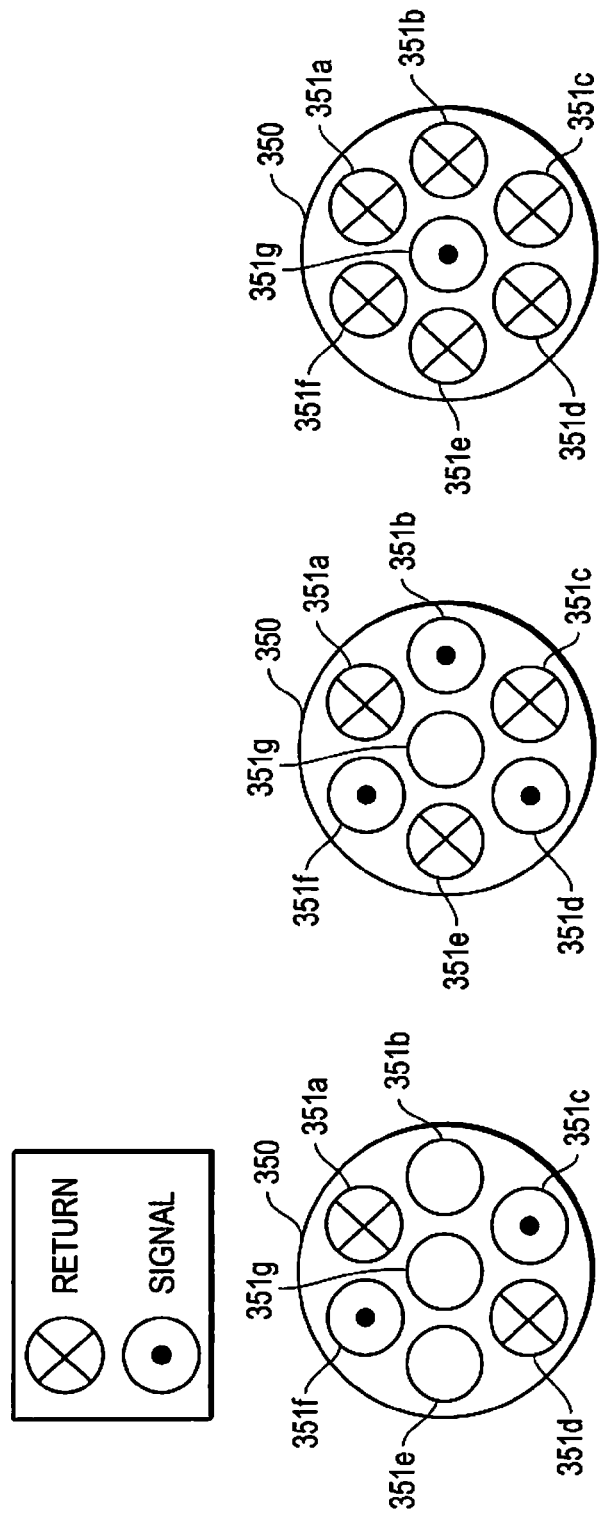

A heptacable can provide for various signal propagation modes, each of which transmits signals on a specific combination of the seven conductors and armor. FIGS. 3-1 through 3-3 depict end views of example wireline heptacable with conductors 351a-g in a cable 350. These views highlight which conductors are activated for T5, T6 and T7 propagation modes, respectively. These views depict which conductors are activated per propagation mode for the T5, T6, and T7 propagation modes. In the T5 mode of FIG. 3-1, a signal is propagated on conductors 351c and 351f, and the return is provided on conductors 351a and 351d. In the T6 mode of FIG. 3-2, the signal is propagated on conductors 351b, 351d, and 351f, and the return is on conductors 351a, 351c, and 351e. In the T7 mode of FIG. 3-3, the signal is propagated on conductor 351g and the return is on conductors 351a-351f and on the surrounding armor 350.

Figure 4:
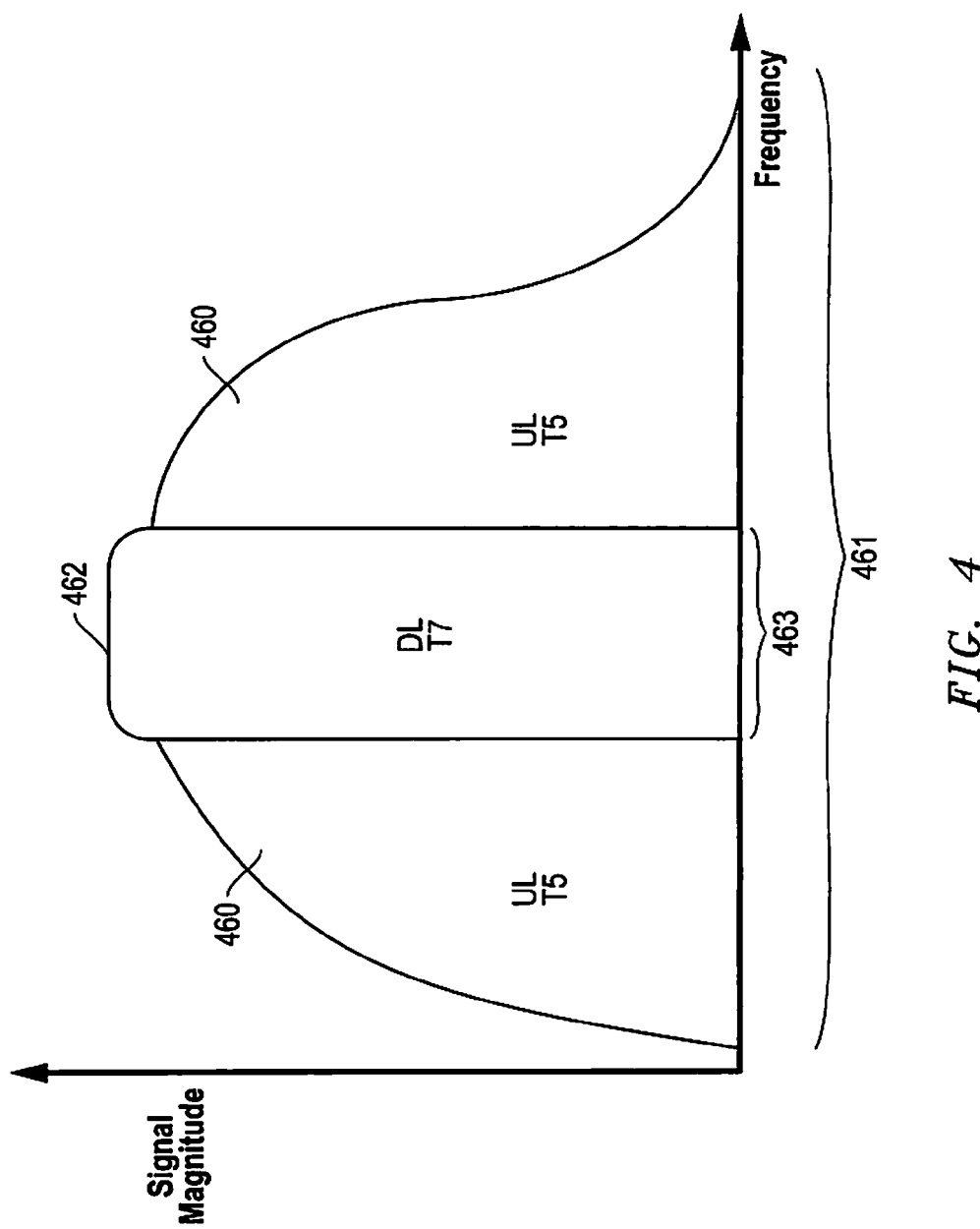
FIG. 4 is a graph illustrating uplink and downlink spectrum allocation transmitted in a multi-carrier frequency, full duplex telemetry architecture.

Referring now to FIG. 4, uplink and downlink signals are transmitted in a multi-carrier frequency, full duplex architecture. The graph shows signal magnitude (y-axis) vs. frequency (x-axis) for a transmitted uplink and downlink spectrum allocation. The full duplex architecture transmits an uplink message 460 and a downlink message 462 simultaneously or overlapping in time. The transmission is with a first propagation mode being devoted to uplink messages and a second propagation mode being devoted to downlink messages across a common frequency bandwidth.

Uplink message 460 propagates in the first propagation mode during time period 461. Downlink message 462 propagates in the second propagation mode during time period 463. The time period 463 overlaps in time with a portion of time period 461, but in differing frequency bands. In the example illustrated in FIG. 4, T7 propagation mode may be used for downlink messages, while T5 propagation mode may be used for uplink messages. Given that uplink data volume is greater than downlink volume data, downlink messages overlap in time with a fraction of uplink messages.

In full duplex architectures simultaneously using two modes (e.g., both T5 and T7) for data transmission in either uplink or downlink transmission, several effects can be noted. Using two modes for uplink results in both modes using overlapping frequency bands. Due to the properties of wireline cables, frequency band overlap results in some far-end cross-talk that causes the uplink signal transmitted on one mode to be seen in the other mode's uplink receiver.

For example, the T5 downhole transmitter's signal (intended for the surface T5 receiver) may also be detectable in the surface T7 receiver due to far end cross-talk (FEXT). The magnitude of the FEXT depends mostly on the construction and maintenance of heptacable symmetry. As there may not be a dedicated mode for downlink, it is possible there may be another cross-talk called "ECHO" in that a receiver may see a portion of the locally transmitted signal on the same mode. As the cross-talk sources are additive in nature, the maximum achievable data rate may be lowered as the cross-talk sources increase in magnitude.

ECHO, in turn, may result in two effects on long cables using full duplex architecture. On long cables (with high attenuation), the receiver may use a high gain in order to minimize analog to digital converter (ADC) quantization noise. However, the gain may also amplify the ECHO, and the receiver can be saturated. As saturation is a non-linear distortion, the signal-to-noise ratio (SNR) may be affected across frequencies, not just those used by the downlink. Thus, for a full duplex architecture, receiver gain may be purposefully limited to reduce the chance of saturation. However, such a measure can increase the impact of ADC and receiver noise and, consequently, degrade SNR, resulting in lower data rates.

A second result with ECHO is that frequency-domain separation between uplink and downlink is possible when the shortened impulse response of the main channel and the ECHO channel can be simultaneously contained within a discrete multi-tone (DMT) cyclic prefix. The impulse-response of the ECHO may be affected by the impedance mismatch (both in magnitude and phase) between the transceiver and the cable's impedance. This may make the ECHO impulse response long and difficult to shorten.

In some cases, the ECHO may be sufficient to disrupt the integrity of the telemetry link in full duplex architecture. However, the ECHO may have an impact in the full duplex architecture where the uplink and downlink happen simultaneously and the separation is frequency based. The architecture disclosed herein, referred to as "half duplex" architecture, can avoid the effects of ECHO by separating uplink and downlink in time. The half duplex architecture does not suffer from ECHO as there may not be simultaneous transmission of uplink and downlink.

Figure 5:
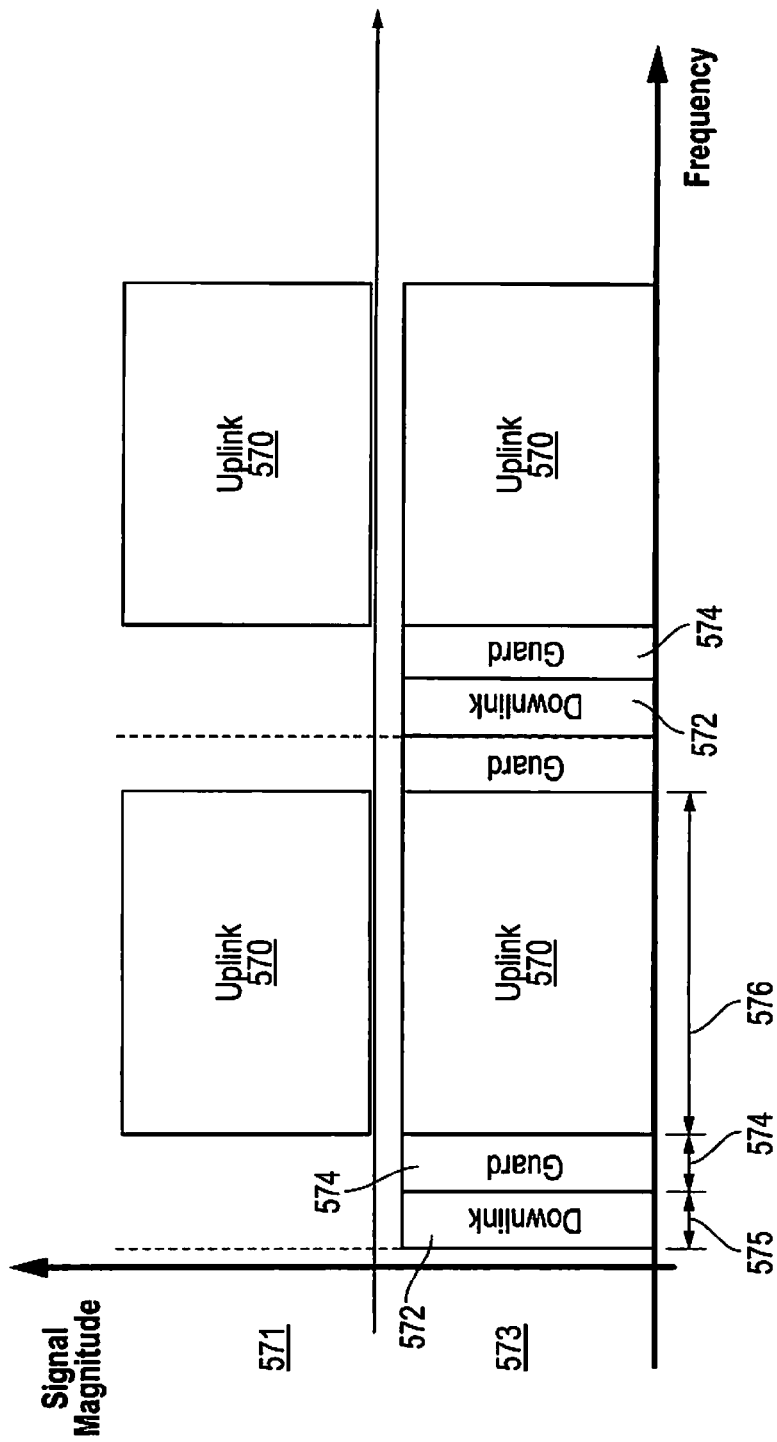
FIG. 5 is a graph illustrating uplink and downlink spectrum allocation transmitted in a multi-carrier frequency, half duplex telemetry architecture in accordance with an embodiment of the present disclosure.

Referring now to FIG. 5, uplink signals and downlink signals transmitted in a multi-carrier frequency, half duplex architecture graphically plotted as signal magnitude versus frequency are shown. The graph illustrates signal magnitude (y-axis) vs. frequency (x-axis) showing transmitted uplink and downlink spectrum allocation. The half duplex architecture described herein retains the discrete multi-tone modulation technique but transmits uplink and downlink during separate time intervals. The half duplex architecture described herein also inserts a block of "guard" samples where both the uplink and downlink are quiet and do not transmit any signal. The guard period gives time for the ECHO impulse response caused by the last transmitted frame to dissipate before the other direction's receiver begins receiving data.

Uplink signals 570 are transmitted in both T7 mode 571 and T5 mode 573 during time periods for uplink 576. Downlink messages 572 are transmitted in T5 mode 573 during time periods for downlink 575. Time periods for downlink 575 and time periods for uplink 576 do not overlap, thus the signals are transmitted sequentially, not simultaneously.

A guard period 574 is interjected between uplink signals 570 and downlink signals 572. The guard period, during which signals are not transmitted in either direction, allows sufficient time for the residual energy caused by the most recently transmitted frame to dissipate before the other direction's telemetry unit begins receiving data. A long guard interval may affect the duty cycle (and data rate) due to the increased time overhead.

In embodiments employing shorter cables, the effect of ECHO may be less severe, and the quiet period 574 can be shortened. In an embodiment, the guard period 574 may be configurable at runtime to optimize the uplink duty cycle. In an embodiment, the guard period 574 may be a parameter that is configured by the surface modem and transmitted to the downhole modem during a training phase as disclosed in related and commonly assigned application entitled "TOOL-STRING COMMUNICATION IN CABLE TELEMETRY" filed concurrently herewith. In an embodiment, the length of the guard period 574 may be transmitted to the other modem during training to allow for future modification/tuning, even if initially fixed at a particular value.

At the surface modem, the guard period 574 provides time for the downlink ECHO to decay away before uplink frames are received. In a half duplex system, the downlink frames represent overhead time that is not spent transmitting uplink data. Thus, to maximize the uplink data rate, the number of downlink frames per uplink/downlink transmission may be minimized. This overhead, the guard period 574, may be minimized by transmitting as many uplink frames as possible before switching to downlink.

An embodiment may have symmetrical use of the propagation modes where uplink and downlink transmissions are present in the propagation modes. Another embodiment may assign downlink or uplink transmissions to one or more propagation modes depending on the data communication rates of the system.

When the downlink portion of the telemetry link is established, the downhole receiver may drop samples in order to align itself with the cable delay. If the uplink frames are transmitted at a fixed interval, then an insufficient guard period may cause a portion of the received downlink frame to overlap the transmitted uplink frame. The overlap may be seen as ECHO in the downlink receiver and implies the previously mentioned effects (clipping, inter-carrier interference, etc.) associated with ECHO and full duplex systems. A half duplex system may have uplink and downlink using the same frequencies. Thus, the guard period may be selected as longer, at least, than the cable round-trip delay to prevent the downlink and uplink frames from overlapping.

Figure 6:
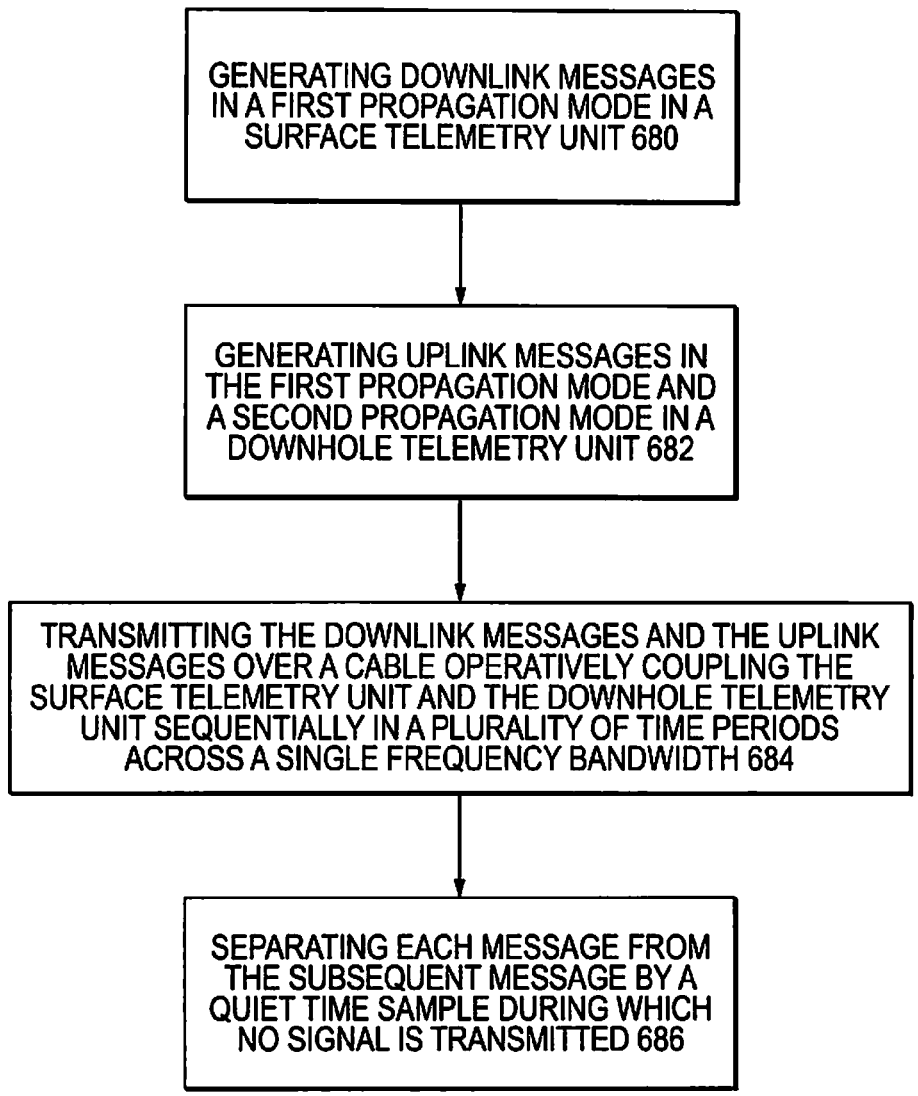
FIG. 6 shows a flow chart illustrating a method of multi-carrier frequency, half duplex cable telemetry in accordance with at least one embodiment of the present disclosure.
Figure 7:
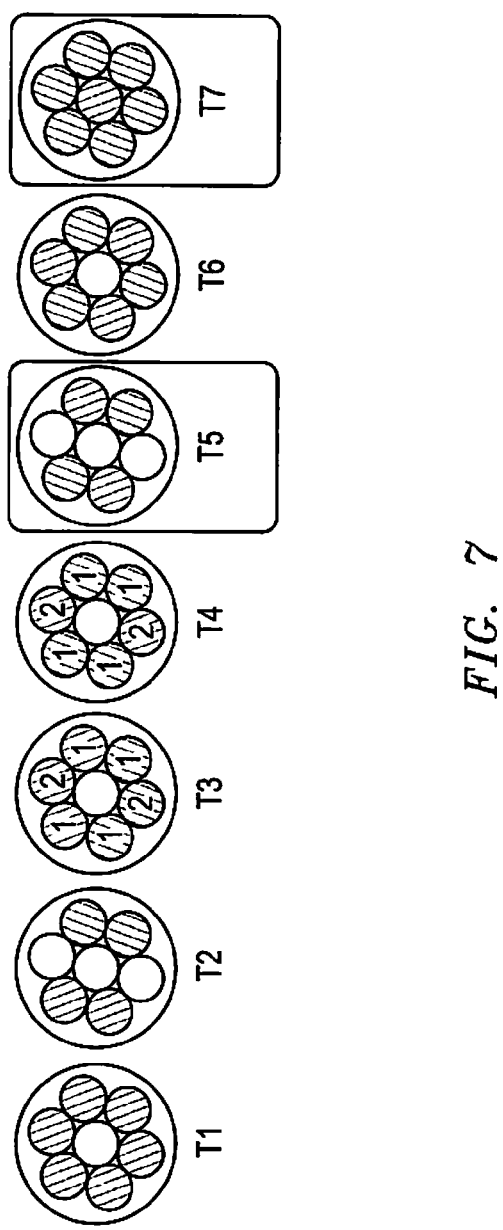
FIG. 7 is a schematic diagram illustrating end views of various propagation modes applied in wireline communication along a heptacable in accordance with an embodiment of the present disclosure.

Referring now to FIG. 6, a flow chart for a method 600 of multi-carrier frequency, half duplex cable telemetry. The method 600 begins with generating 680 downlink messages in a first propagation mode in a surface telemetry unit. In an embodiment, the cable includes a wireline heptacable. In an embodiment, the first propagation mode includes, for example, T5 propagation mode. FIG. 7 depicts end views of seven different propagation modes T1 through T7 that may be applied in wireline communication along a heptacable.

Referring still to FIG. 6, the method continues with generating 682 uplink messages in the first propagation mode and a second propagation mode in a downhole telemetry unit. In an embodiment, the second propagation mode includes, for example, T7 propagation mode.

The method continues with transmitting 684 the downlink messages and the uplink messages over a cable operatively coupling the surface telemetry unit and the downhole telemetry unit sequentially in a plurality of time periods across a single frequency bandwidth.

The method continues with separating 686 each message from the subsequent message by a quiet time sample during which no signal is transmitted. In some embodiments, the length of the quiet time sample is determined based on the length of the cable. In some embodiments, the length of the quiet time sample is determined based on at least one of a time interval sufficient for a cross-talk ECHO to dissipate, and a travel latency time sufficient to avoid overlap of the downlink messages and the uplink messages. In an embodiment, the length of the quiet time sample includes a variable user input.

Multi-Carrier Frequency, Half Duplex Cable Telemetry Explanation

Wireline operations may be performed on a number of different cable types based on the number of conductors in the cable. The monocable may have a single conductor with a return on the armor wires, while the coaxial cable can have a single conductor with a return on the serve around it isolated from the armor. The heptacable may have, for example, seven conductors and armor.

Enhanced Digital Telemetry System (EDTS) version 2.0 (commercially available from SCHLUMBERGER TECHNOLOGY CORPORATION™ see: www.slb.com) cable telemetry is intended to work with the heptacable-construction cable. The heptacable may have seven natural modes. EDTS 2.0 cable telemetry uses two of these modes: T5 and T7. T5 mode is a differential mode that uses wires 2, 3, 5 and 6, and has immunity to common mode noise. T7 uses wire 7, a return on the remaining wires and the armor, and, hence, behaves as coaxial cable. These two modes may possess the select telemetry channel characteristics in earlier telemetry systems, and may be used in wireline telemetry systems. FIG. 7 shows an end view of seven different propagation modes T1 through T7 applied in wireline communication along a heptacable.

Figure 8:
FIG. 8 is a schematic block diagram of a cable telemetry system illustrating the passage of signals therethrough in accordance with an embodiment of the present disclosure.
Figure 9:
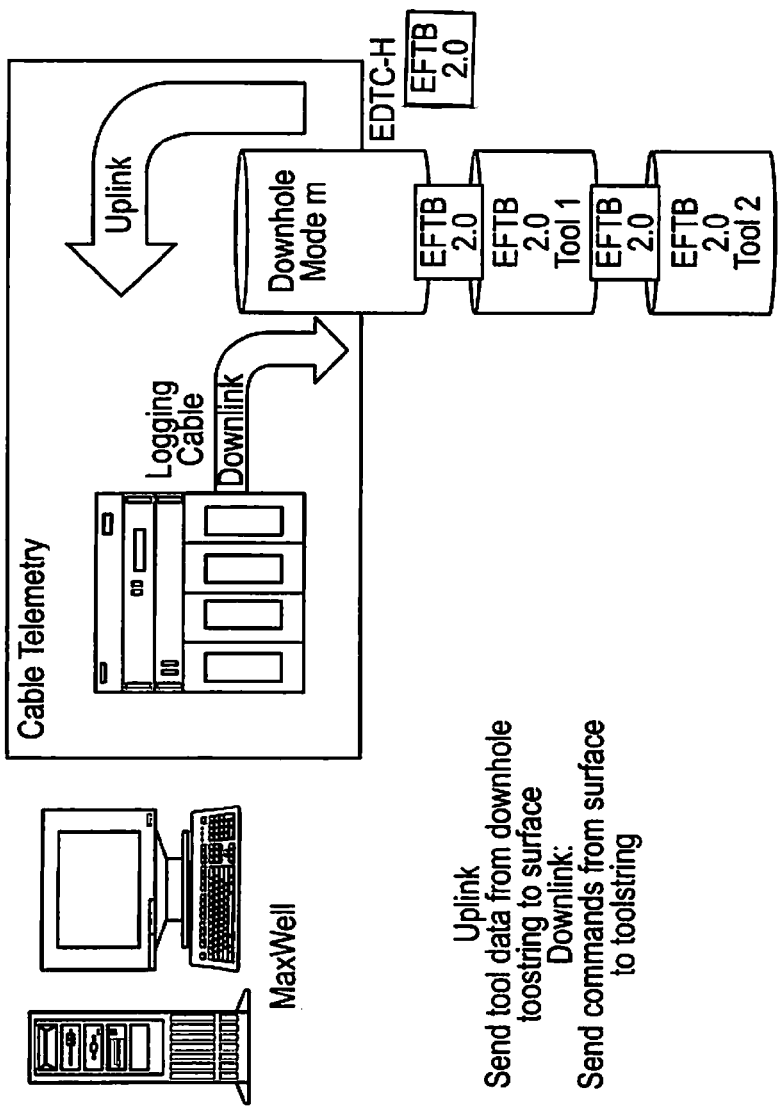
FIG. 9 is a schematic diagram of a cable telemetry system illustrating uplink and downlink therethrough in accordance with an embodiment of the present disclosure.

A purpose of cable link telemetry (as shown in FIGS. 8 and 9) may be to enable data reception from the tools of the toolstring and to enable sending commands to the tools via the wireline heptacable. FIG. 8 depicts data transfer between a MAXWELL™ tool application, an uphole modem, a downhole modem and a tool. The communication between the MAXWELL™ tool application and an uphole modem and the communication between the downhole modem and the tool involve uplink data and commands. The communication between the uphole modem and the downhole modem involves modem signals (cable telemetry). The cable telemetry may provide delivery from uphole to downhole modem only. The EDTS 2.0 components may be used to provide delivery from MAXWELL™ tool application to tool.

FIG. 9 shows data transfer between a surface modem (e.g., with MAXWELL™ tool applications) and a downhole toolstring. The transfer involves downlink via logging cable from a cable telemetry to a toolstring with a downhole modem m, tools 1 and 2, and uplink back thereto.

Cable telemetry is configured to avoid altering data or commands. EDTS 2.0 cable telemetry is built in the uphole and downhole modems. This uses a multi-carrier modulation technology called DMT. This technology may also be used in other telemetry systems, such as EDTS (a predecessor of EDTS 2.0 commercially available from SCHLUMBERGER TECHNOLOGY CORPORATION™ see: www.slb.com). While EDTS cable telemetry uses a single uplink channel on T5 and a single downlink channel on T7, EDTS 2.0 may use both T5 and T7. Using both T5 and T7 may provide uplink data transmission at nearly double the data rate, and may use T5 for downlink transmission.

Due to the properties of wireline cables, there may be some FEXT that causes the uplink signal transmitted on one mode to be seen in the other mode's uplink receiver. For example, the T5 downhole transmitter's signal (intended for the surface T5 receiver) may also be detectable in the surface T7 receiver due to FEXT. The magnitude of the FEXT may depend on the construction and maintenance of heptacable symmetry. As there may be no dedicated mode for downlink, there may be another FEXT called "ECHO" in that a receiver may see a portion of the locally transmitted signal on the same mode. As the FEXT source may be additive in nature, the maximum achievable data rate may be lowered as the cross-talk sources increase in magnitude.

Figure 10:
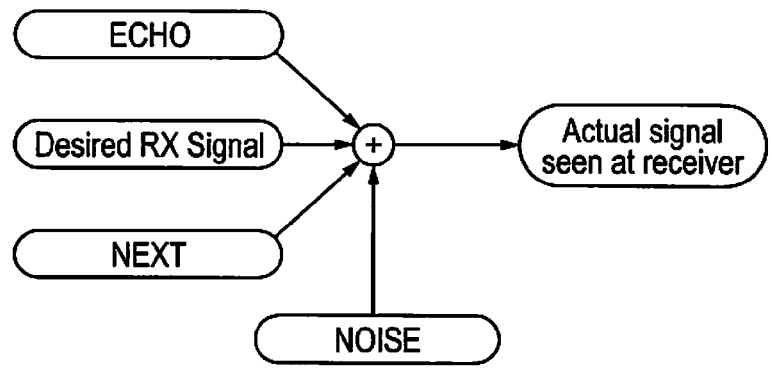
FIG. 10 is a schematic diagram illustrating a cumulative signal in accordance with an embodiment of the present disclosure.

As shown in FIG. 10 a cumulative signal (i.e. Actual signal seen at receiver) may be generated from a combination of a receiver signal (RX), cross-talk (ECHO), near end cross-talk (NEXT), and noise effects added.

Figure 11:
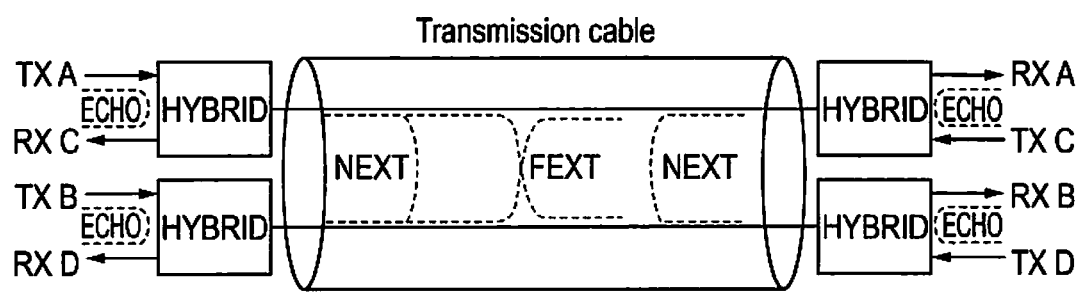
FIG. 11 is a schematic diagram illustrating cumulative cross-talk sources on a wireline heptacable in accordance with an embodiment of the present disclosure.

FIG. 11 shows a schematic of cumulative cross-talk (ECHO) sources on a wireline heptacable (i.e. transmission cable). The heptacable may include NEXT, FEXT and other components. The ECHOS extend from TX A and B to hybrids and back to RX C and D on one side, and ECHOS extend from TX C and D to hybrids and back to RX A and RX B on another side of the heptacable.

The ECHOs may result in two effects on long cables for the full duplex architecture. On long cables (e.g., with high attenuation), the receiver may use a high gain in order to minimize ADC quantization noise. However, the gain may also amplify the ECHO, and the receiver can be saturated. As saturation is a non-linear distortion, it may impact the SNR on various frequencies, not just those used by the downlink. So with a full duplex architecture, receiver gain may have to be limited to reduce the chance of saturation. However, such a measure may increase the impact of ADC and receiver noise and consequently degrade SNR, which may result in lower data rates.

A second effect with ECHO is that frequency-domain separation between uplink and downlink may be possible when the shortened impulse response of the main channel and the ECHO channel can be simultaneously contained within a DMT cyclic prefix. Additionally, the impulse response of the ECHO can be affected by the impedance mismatch (both in magnitude and phase) between the transceiver and the cable's impedance. This may make the ECHO impulse response long and difficult to shorten.

The effect of ECHO can be severe in full duplex architectures. The level of ECHO may be as much as 50 dB more than NEXT on a telemetry interface module (e.g., eWAFE™), and can have a negative impact on the uplink data rate for full duplex architecture. In some cases, the ECHO could be sufficient to disrupt the integrity of the telemetry link.

ECHO is a property of the physical interfaces, such as the hybrid and its impedance matching to the cable, as well as the relative size of the signal to the ECHO which may depend on the cable characteristics. The ECHO may have an impact in the full duplex architecture where the uplink and downlink happen simultaneously and the separation is frequency based. Thus, the half duplex architecture may avoid the effects of ECHO by separating uplink and downlink in time. The half duplex architecture may not suffer from ECHO as there is no simultaneous transmission of uplink and downlink.

To overcome the effects detailed above, the following physical layer architecture may support, for example, about 150 KHz, 200 KHz, and 250 KHz bandwidths, have an uplink/downlink structure, about 36 uplink frames per 1 downlink frame at 150 KHz, 200 KHz, 250 KHz bandwidths, and about 100 fixed samples of quiet time between uplink/downlink at 150 KHz, 200 KHz, 250 KHz bandwidths. The quiet time value may be transmitted to other modes during training to allow for future modification. The architecture may also allow for single-mode operation on T5 or dual uplink mode (T5+T7) operation. The architecture may also allow variable downlink bit allocation (150 KHz: ~900 bits total, ~600 data bits, ~300 maintenance bits), thus allowing for data rates to be met at 150 KHz bandwidth and above.

FIG. 12 shows a time-domain diagram of uplink and downlink frames in a half duplex architecture. This time-domain diagram depicts T5 and T7 schedules. The T5 schedule includes 1 T5 downlink (DL) frame, 50 T5 quite samples, 36 T5 uplink (UL) frames and 50 T5 quiet samples. The T7 schedule includes a quite frame, 50 T5 quite samples, 36 T7 uplink frames and 50 T7 quiet samples. FIGS. 13-1 and 13-2 show oscilloscope captures for a time domain diagram. These figures showing uplink frames and downlink frame therebetween. FIG. 13-2 is a zoomed-in version of FIG. 13-1.

The half duplex architecture retains the discrete multi-tone modulation technique, but transmits uplink and downlink during separate time intervals. It also inserts a block of "guard" or "quiet" samples where both the uplink and downlink do not transmit any signal. This period gives time for the (shortened) ECHO impulse response caused by the last transmitted frame to dissipate before the other direction's receiver begins receiving data.

Sampling timing synchronization may be performed for the systems herein. Example sampling timing synchronizations that may be used are described in U.S. Pat. No. 6,778,622. In the half duplex system of the present disclosure, there are two ways sampling timing can be maintained. The surface FPGA sample frequency offset may change value slowly (for example, in an embodiment, each few minutes). This mechanism may track without updates for a few frames using the previously known offset. Since per-frame clock shifts by design occur with probability less than one half ($50/100$) and the downlink+quiet interval may be short (in an example embodiment, less than 2 frames), the per-frame clock shifts can account for the lack of adjustment during this interval. The first few uplink frames may experience a slightly larger shift, but the effect of this shift can be remedied through digital rotations.

Linear regression estimated during the uplink interval could be used to extrapolate the pilot angle through the quiet & downlink periods. This may permit the clock cycle shift to be applied during the downlink & quiet intervals using the predicted pilot tone phase. As EDTS may perform linear regression over hundreds of frames (e.g., extrapolation over one or two frames can be performed). By the next uplink frame, the extrapolation would predict the true pilot tone phase taking into account any clock cycle adjustments.

The system may also be used with variable quiet time. At first glance, the quiet period could be an entire frame's worth of samples, as the ECHO impulse response may die off exponentially. However, such a long guard interval may lower the duty cycle (and data rate) due to the increased time overhead. Furthermore, the quiet period may be long enough for the shortened (post-TEQ) ECHO impulse response to dissipate. Although the time domain equivalent (TEQ) may or may not explicitly try to shorten the ECHO impulse response.

Figures 1, 14:
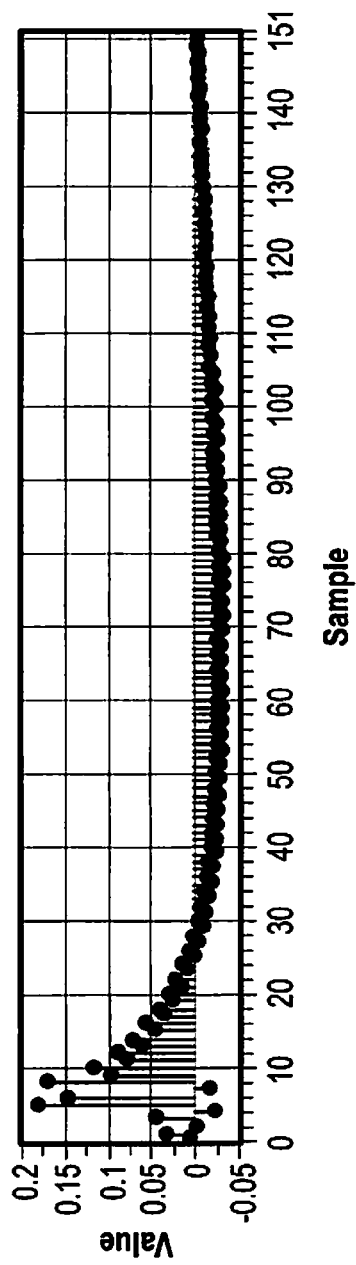
Figures 2, 14:
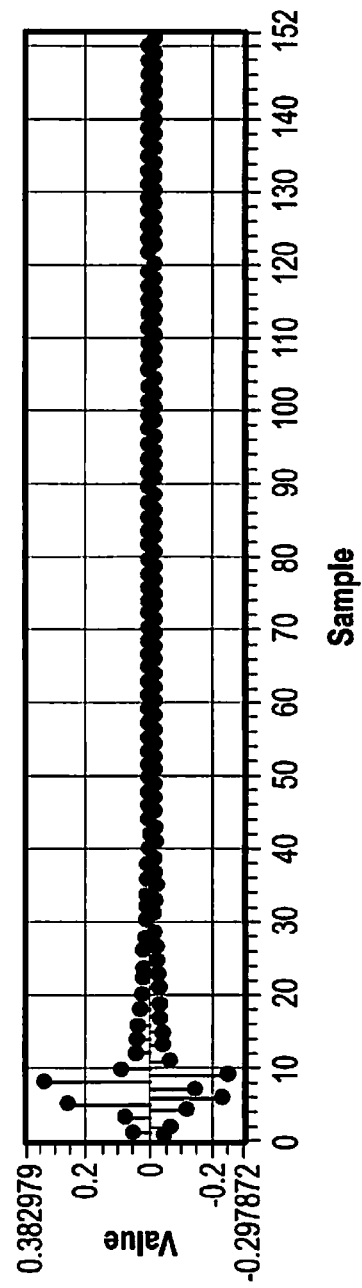

FIGS. 14-1 and 14-2 are graphs showing a shortened ECHO impulse response after TEQ, and a corresponding un-shortened ECHO impulse response before TEQ, respectively. Each graph depicts value (y-axis) versus sample number (x-axis). These figures show the ECHO impulse response on 36 k feet (ft) (10.97 km) 7-48 A heptacable for 200 KHz bandwidth. Although clipping may occur in the un-shortened impulse response, the duration in which the un-shortened impulse response has large enough amplitude to cause clipping can be neglected.

Using the above observations, in an example embodiment, 50 samples of quiet time may be sufficient at 150 KHz bandwidth on 36 k ft (10.97 km) of 7-48 A heptacable. This amount of quiet time may not be sufficient for 200 KHz and 250 KHz. On shorter cables the effect of ECHO may be less severe and the quiet interval may be shortened. Thus it may be useful to have the quiet portion configurable at runtime to optimize the uplink duty cycle. It could be a parameter that is configured by the surface modem and transmitted to the downhole modem during training. The quiet interval length may be transmitted to the other modem during training to allow for future modification/tuning (even if it is initially fixed at a particular value, such as 100 samples).

The length of the guard interval is a design parameter that may be used for half duplex architecture. The guard interval provides time for the downlink ECHO to decay away before the uplink frames are received. Thus, the guard interval may be longer than the (shortened) ECHO impulse response (at the surface).

The guard interval may provide a "cushion" at the downhole modem, between the downlink receiver receiving downlink frames and the uplink transmitter transmitting uplink frames. In EDTS, the downlink frame boundaries may be aligned to the uplink frame boundaries on the surface modem. This alignment may result from the downhole (uplink) transmitter initiating the telemetry link at power up. The same alignment may carry over into EDTS 2.0. When the downlink portion of the telemetry link is established, the downhole receiver may have to drop samples in order to align itself with the cable delay. If the uplink frames are transmitted at a fixed interval, then an insufficient guard period may cause a portion of the received downlink frame to overlap the transmitted uplink frame.

The overlap may be seen as ECHO in the downlink receiver and implies the previously mentioned issues (e.g., inter-carrier interference, etc.) associated with ECHO and full duplex systems. Moreover a half duplex system may have uplink and downlink using the same frequencies. Thus, the guard period may be selected as longer than the cable round-trip delay to prevent the downlink and uplink frames from overlapping.

Figure 15:
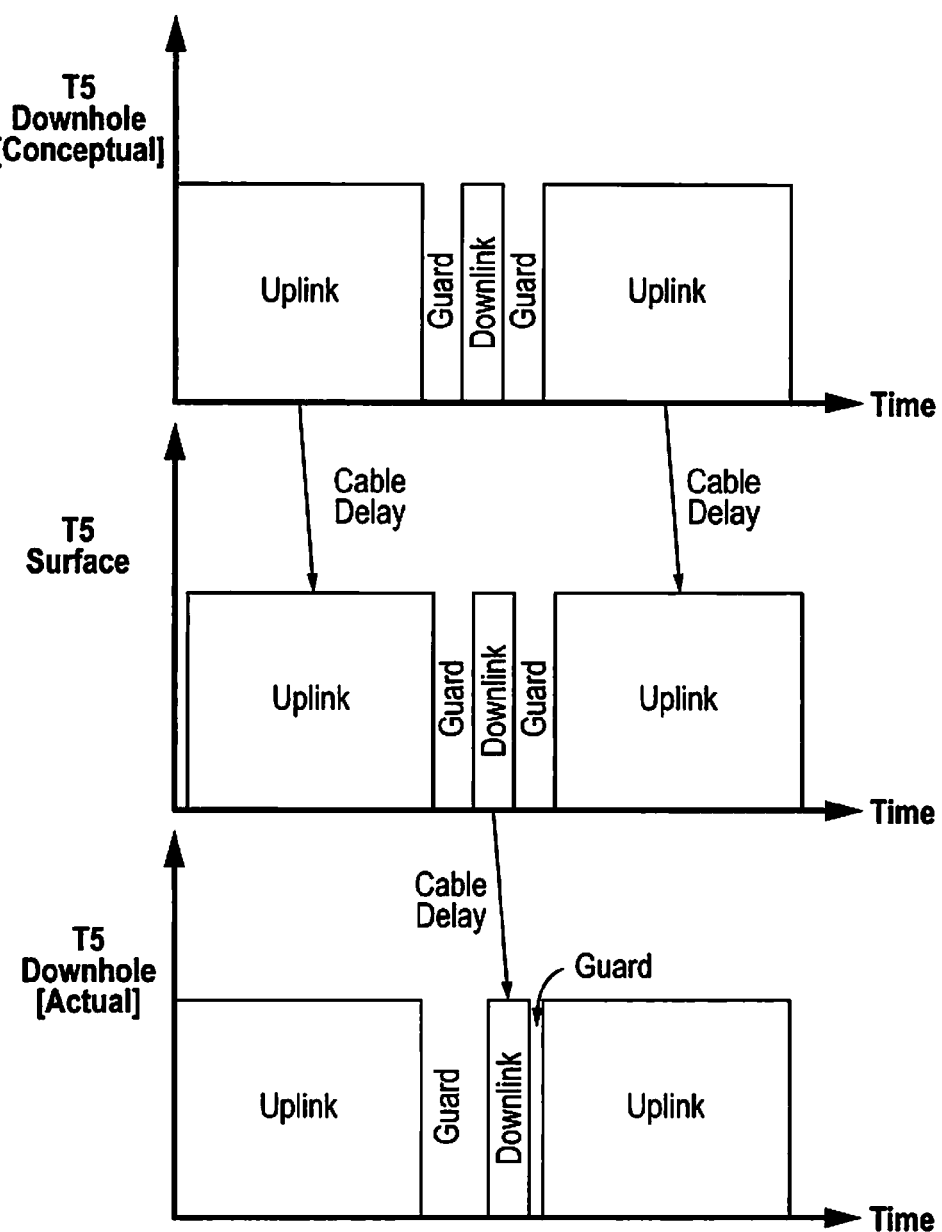
FIG. 15 is a graph illustrating cable delay on guard interval length in accordance with an embodiment of the present disclosure.

FIG. 15 graphically shows an effect of delay on guard interval length of the frames. This figure includes three graphs of T5 downhole (conceptual), T5 surface, and T5 downhole (actual) (y-axis) versus time (x-axis), respectively. Each figure also includes an uplink and a downlink with two guards and downlink therebetween. The downlink is positioned between the two guards. Cable delays extend between the uplinks of the top two graphs. Another cable delay extends from the downlink of the middle graph to the downlink of the bottom graph.

Table 1 provides example (one-way) cable latencies measured for 150 KHz bandwidth:

TABLE 1

| Cable | T5 Delay (Samples) | T7 Delay (Samples) |
|---|---|---|
| 7k ft P | 4 | 4 |
| 21k ft A | 13 | 11 |
| 31k ft NT | 23 | 21 |
| 31 NT + 7p | 27 | 25 |

In an example embodiment, a 50 sample guard interval may work for up to about 36 k ft (10.97 km) 7-48 A cable, the round-trip delay of such a cable (at about 150 KHz) is approximately 45 samples (36 k ft (10.97 km)/21 k ft (6.4 km)×13 samples×2). At 200 KHz the round-trip delay is about 60 samples. If a 3 tap TEQ is used, the cyclic prefix of the first uplink frame provides an amount of additional guard time (e.g., about 14 samples). In short, the guard interval may be set to a value greater than 50 samples for 200 KHz (or about 250 KHz) bandwidth operation, for example on longer cables. At least 100 samples may allow for half duplex operation on cables up to about 80 k ft (24.38 km) at about 150 KHz and 48 k ft (14.63 km) at 250 KHz. Furthermore, a 100 sample guard interval may not decrease the duty cycle.

In terms of the physical layer, the following tasks may be performed at each uplink frame: update the frequency-domain equalizer (FEQ), update the mean-squared noise (MSN) measurement (for SNR), generate bit swapping tone list for the uplink channel (each ~2 seconds), and optionally bit swapping tone list for the downlink channel.

In the half duplex architecture of the present disclosure, these operations could be split across data frames and/or performed during the quiet and downlink intervals. The SYNC frame may not be called for in EDTS 2.0 and may be reduced in the half duplex architecture.

For the downlink, half duplex EDTS 2.0 may not call for bit-swapping. In an embodiment, the minimum downlink margin may be about more than 20 dB on about 36 k ft (10.97 km) cable across various tones on a DMT testbed. Optionally, downlink bit-swapping could be implemented using the first or last uplink frame as a reference.

Downhole on-board-programming (OBP) mode may also be used. Where the downlink data rate may be about 8-9 kbps, few (if any) downlink commands may be sent after a toolstring is initialized. In some circumstances, a large amount of downlink data may be sent. For example, downhole EPROM programming and/or downhole firmware upgrade operations call for a large amount of data to be transferred downhole. In an embodiment, these operations may be performed in a shop or lab, rather than during a field job and may call for a minimal uplink data rate. For these operations, the number of uplink frames between downlinks could be reduced in order to support faster downlink data rates.

Implementation options, such as those in Table 2, may be used to insure compatibility with previous systems. Uplink data rates represent the total sum of T5 and T7 data rates.

TABLE 2

| Uplink Data | (As high as possible) |
|---|---|
| Uplink Maintenance | >=4.48 kbps |
| Downlink Data | >=15 Hz, >=8.96 kbps |
| Downlink Maintenance | >=8.235 Hz, >=4.48 kbps |

In 150 KHz system, a DMT frame of 256 carriers and 16 sample cyclic prefix may result in a frame rate of 568.18 Hz. In a half duplex system, the quiet period is an overhead that decreases the uplink and downlink throughput. This overhead may be minimized by transmitting as many uplink frames as possible before switching to downlink. The downlink latency requirement (e.g., greater than about 15 Hz) constrains the maximum number of uplink frames between downlinks. Since 568.18 Hz/15 Hz=37.87, there may be a downlink frame, for example, at least each 37 frames. In other words, there may be no more than 36 frames per 1 downlink frame (assuming that an entire downlink packet could be transmitted in one downlink frame, not including time for the quiet interval). Similarly, there may be a downlink frame at least each 50 frames for 200 KHz bandwidth, 63 frames for 250 KHz bandwidth.

In a half duplex system, the downlink frames represent time that is not spent transmitting uplink data. The uplink data rate may be maximized by minimizing the number of downlink frames per uplink/downlink transmission. This may cause relative higher number of bits to be allocated to the downlink frames.

About 1500 total bits may be called for the downlink to support the data and maintenance channels at a 15 Hz transmission rate. As there are fewer than 256 carriers per frame, using a fixed bit allocation (for various cables) may not be a viable option. For example, putting 4 bits on 200 tones may result in margins in the lower tones (where SNR is good) and a lower margin on the higher tones where the SNR is poor. In an embodiment, the SNR may change by as much as 20 dB from the peak to the minimum. Such an allocation may also be prone to narrowband interference generated by the power systems, etc.

For half duplex, the downlink should dynamically allocate bits based on the measured SNR. The per tone gains may not be varied (e.g. "fine gains"), but the number of bits may be varied according to SNR. Such an allocation may improve the minimum downlink margin across various tones.

When considering half duplex systems, the "duty cycle" (portion of time that the uplink is actively transmitting data) may be computed. Duty cycle can then be used to compare the efficiency of a half duplex system versus that of an EDTS (which transmits data 68/69=98.6% of the time). The number of bits per frame to sustain a particular data rate and to calculate the downlink latency (due to quiet portions) may also be computed.

The half duplex duty cycle may be represented by Equations 1 and 2:

$$UplinkDutyCycle_{HalfDuplex} = \frac{(\# \ UplinkFrames \cdot UplinkFrameTime)}{T} \quad \text{Equation (1)}$$

$$UplinkDutyCycle_{HalfDuplex} = \frac{(\# \ UplinkFrames \cdot UplinkFrameTime)}{T} \quad \text{Equation (2)}$$

$$T = (\# \ UplinkFrames \cdot UplinkFrameDuration) +$$
$$(\# \ DownlinkFrames \cdot DownlinkFrameDuration) +$$
$$(\# \ QuietSamples \cdot QuietSampleDuration)$$

where T is the total time.

If both uplink and downlink use the same FFT size (512 samples) and the same cyclic prefix (16 samples), then the frame length is 528 samples and the duty cycle and consequent data rate become the following in Equations 3 and 4:

$$UplinkDutyCycle_{HalfDuplex} = \quad \text{Equation (3)}$$
$$\frac{(\# \ UplinkFrames)}{(\# \ UplinkFrames) + (\# \ DownlinkFrames) + 2 \cdot (\# \ QuietSamples/528)}$$

$$UplinkDataRate_{HalfDuplex} =$$
$$UplinkDutyCycle_{HalfDuplex} * UplinkBitsPerFrame$$

$$DownlinkFrequency_{HalfDuplex} = (RawFrameRate) \quad \text{Equation (4)}$$
$$\frac{(1 DownlinkFrame)}{(\#UplinkFrames) + (1 DownlinkFrame) + (2 * QuietSamples/528)} =$$
$$\frac{(RawFrameRate)}{(\#UplinkFrames) + 1 + (2 * QuietSamples/528)}$$

$$RawFramesRate = (Bandwidth/2)/(528 \ Samples)$$

Table 3 below show various parameters for various bandwidths:

TABLE 3

| Bandwidth (KHz) | Frame Rate (Hz) | Uplink Frames | Downlink Frames | Quiet Samples | Uplink Duty Cycle % | Downlink Duty Cycle % | Downlink Frequency (Hz) | Downlink Data Bits/Frame | Downlink Maintenance Bits/Frame |
|---|---|---|---|---|---|---|---|---|---|
| 150 | 568.18 | 36 | 1 | 0 | 97.3 | 2.7 | 15.36 | 583 | 292 |
| 150 | 568.18 | 36 | 1 | 50 | 96.8 | 2.7 | 15.28 | 586 | 293 |
| 150 | 568.18 | 36 | 1 | 100 | 96.3 | 2.7 | 15.20 | 589 | 295 |
| 150 | 568.18 | 36 | 1 | 250 | 94.9 | 2.6 | 14.97 | 598 | 299 |
| 150 | 568.18 | 36 | 1 | 528 | 92.3 | 2.6 | 14.57 | 615 | 308 |
| 200 | 757.58 | 36 | 1 | 0 | 97.3 | 2.7 | 20.48 | 438 | 219 |
| 200 | 757.58 | 36 | 1 | 50 | 96.8 | 2.7 | 20.37 | 440 | 220 |
| 200 | 757.58 | 36 | 1 | 100 | 96.3 | 2.7 | 20.27 | 442 | 221 |

TABLE 3-continued

| Bandwidth (KHz) | Frame Rate (Hz) | Uplink Frames | Downlink Frames | Quiet Samples | Uplink Duty Cycle % | Downlink Duty Cycle % | Downlink Frequency (Hz) | Downlink Data Bits/Frame | Downlink Maintenance Bits/Frame |
|---|---|---|---|---|---|---|---|---|---|
| 200 | 757.58 | 36 | 1 | 250 | 94.9 | 2.6 | 19.96 | 449 | 224 |
| 200 | 757.58 | 36 | 1 | 528 | 92.3 | 2.6 | 19.43 | 461 | 231 |
| 250 | 946.97 | 36 | 1 | 0 | 97.3 | 2.7 | 25.59 | 350 | 175 |
| 250 | 946.97 | 36 | 1 | 50 | 96.8 | 2.7 | 25.46 | 352 | 176 |
| 250 | 946.97 | 36 | 1 | 100 | 96.3 | 2.7 | 25.33 | 354 | 177 |
| 250 | 946.97 | 36 | 1 | 250 | 94.9 | 2.6 | 24.96 | 359 | 180 |
| 250 | 946.97 | 36 | 1 | 528 | 92.3 | 2.6 | 24.28 | 369 | 185 |
| Uplink interval increased to maintain same downlink data rate as 150 KHz: | | | | | | | | | |
| 200 | 757.58 | 49 | 1 | 0 | 98.0 | 2.0 | 15.15 | 591 | 296 |
| 200 | 757.58 | 49 | 1 | 50 | 97.6 | 2.0 | 15.09 | 594 | 297 |
| 200 | 757.58 | 49 | 1 | 100 | 97.3 | 2.0 | 15.04 | 596 | 298 |

The downlink duty cycle can be calculated in a similar manner. It is also related to the frequency at which downlink transmissions are sent. For sending one downlink frame per uplink, the following is found:

In an embodiment, downlink packets may arrive continuously at a rate not less than about 15 Hz. If one downlink frame is transmitted between uplinks at 150 KHz bandwidth, then no more than about 36 uplink frames may be transmitted by the downlink frame as shown in Table 3 above. The length of the quiet interval may have a minor effect on the effective downlink frequency.

In an embodiment, if an entire downlink maintenance packet (maximum of 160 bits) is transmitted at 15 Hz (in a single downlink frame), then less memory may be used for the downhole uplink superpacket buffers and the master-slave clock synchronization may be improved over EDTS. As the 15 Hz rate is used for the downlink data channel (and it is possible to allocate more than about 160 bits/frame for the downlink maintenance channel), the changes in EDTS 2.0 may be obtained at low cost.

The calculations involving the number of uplink frames per downlink frame consider the minimum number for 150 KHz bandwidth. In an embodiment, the downlink data and maintenance channel may increase in both rate and frequency due to the faster frame rate achieved at 200 KHz bandwidth. For half duplex EDTS 2.0 at 200 KHz bandwidth, the downlink data rate and frequency may not increase. The downlink maintenance channel frequency also may not increase since the uplink superpacket rate is not dependent on bandwidth. To maintain 15 Hz downlink rate with a frame rate of 757.58 Hz (200 KHz bandwidth), there could be as many as 49 uplink frames per downlink frame (757.58/15=50.503). With no quiet period, the maximum 150 KHz duty cycle is 36/37=97.3%. The maximum 200 KHz duty cycle would be 49/50=98%. The difference in duty cycles may affect implementation. For example (not including quiet time), a system that achieves 3 Mbps from a 97.3% duty cycle may achieve 3.022 Mbps with a 98% duty cycle.

Figure 16:
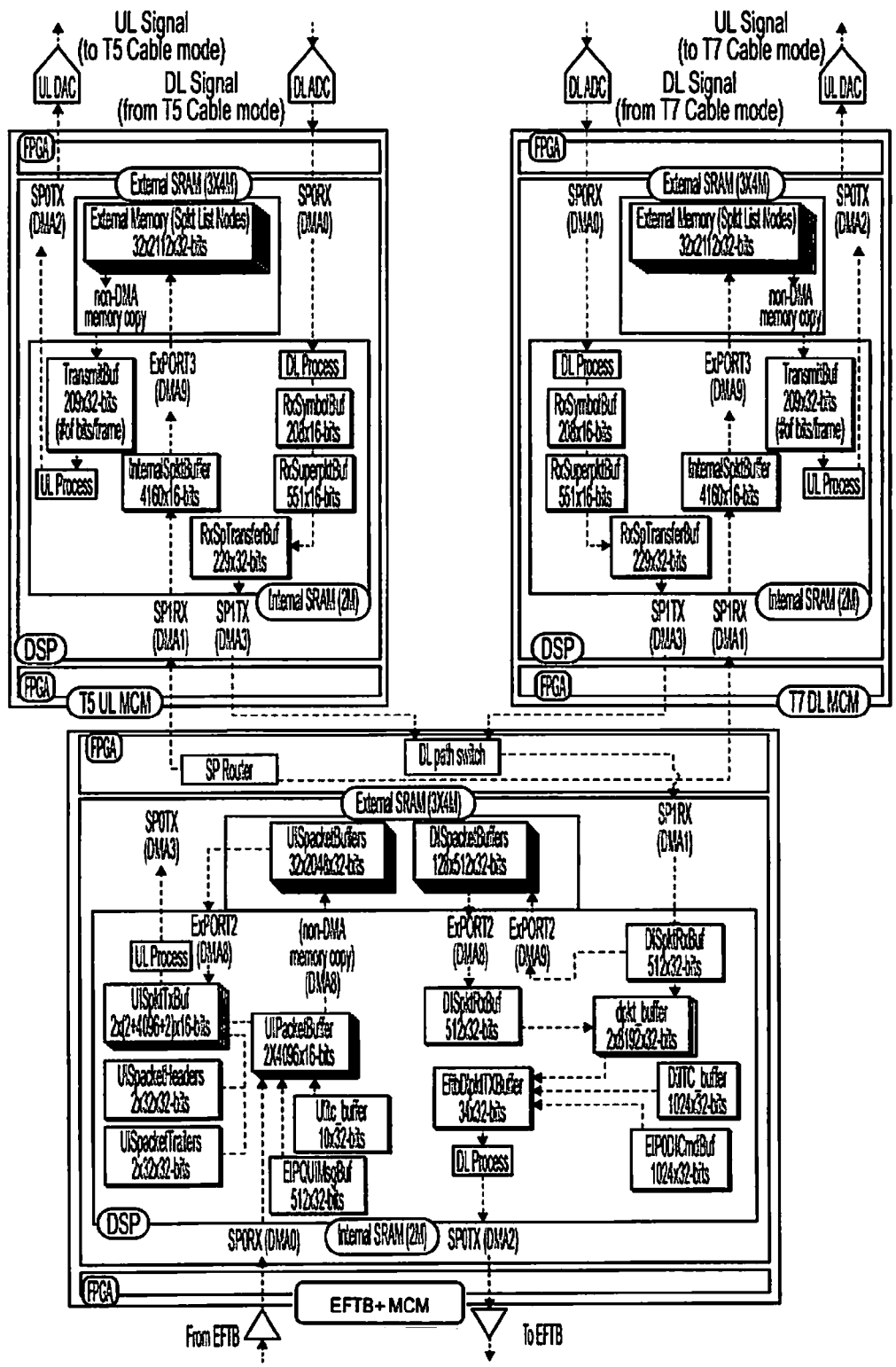
FIG. 16 is a graph illustrating a process to manage superpacket data flow in accordance with an embodiment of the present disclosure.

FIG. 16 shows a process for managing superpacket data flow. This figure depicts uplink and downlink signals using a T5 and T7 cable. In an embodiment, the EFTB 2.0 is designed to be more independent from the modem process compared to the EFTB in EDTS. At the top of FIG. 16, four signals can be seen. From left to right, an outgoing uplink signal out to, for example, T5 cable propagation mode from an uplink digital to analog converter, an incoming downlink signal from, for example, T5 cable propagation mode, into a downlink analog to digital converter, an incoming downlink signal from, for example, a T7 cable propagation mode to a downlink analog to digital converter, and an outgoing uplink signal to, for example, a T7 cable propagation mode, from an uplink digital to analog converter.

In specific detail, the downlink signals will be discussed first (the middle incoming signals at the top of FIG. 16 respectively). The T5 downlink signal ($2^{nd}$ from the left at the top of FIG. 16) passes from the downlink analog to digital converter to a downlink process (in internal SRAM) of the T5 uplink MCM via input SP0RX (DMA0), to be buffered at internal SRAM in the various buffers: Receiver Symbol Buffer, Receiver Superpacket Buffer, and Receiver Superpacket Transfer Buffer, respectively. The T5 downlink signal is then passed to the downlink path switch on the EFTB+MCM via input SP1TX (DMA3). On the EFTB+MCM, the signal is passed via input SP1RX to buffers downlink superpacket receiver buffer, to downlink packet buffer, to EFTB downlink packet transmitter buffer, to downlink process, and out to EFTB on input SP0TX (DMA2). The data can also be buffered in external SRAM 3×4M at downlink superpacket buffer temporarily, and then passed to downlink superpacket receiver buffer, downlink packet buffer, and so on.

The T7 downlink signal ($3^{rd}$ from the left at the top of FIG. 16) is passed from the downlink analog to digital converter to the T7 downlink MCM on the input SP0RX (DMA0) to downlink process (in internal SRAM) of the T7 downlink MCM. The signal is buffered in the various buffers of the internal SRAM of the T7 downlink MCM: Receiver Symbol Buffer, Receiver Superpacket Buffer, and Receiver Superpacket Transfer Buffer, before passing to the downlink path switch on the EFTB+MCM via input SP1TX (DMA3). Once on the EFTB+MCM, the T7 downlink signal can pass along the same data pathway that the T5 downlink signal follows through the EFTB+MCM.

An uplink signal enters the EFTB+MCM from the EFTB at the bottom left input on FIG. 16, passing to a digital signal processor DSP via input SP0RX (DMA0). The uplink signal then can pass through various buffers: EIP Queue Message Buffer, Uplink Controller Buffer, and Uplink Packet Buffer. The data signal is then passed to the internal superpacket transmitter buffer (and optionally, divided into headers and trailer portions of the signal, buffered at uplink superpacket headers buffer and uplink superpacket trailers buffer). The signal is then passed to the uplink process of the DSP of the EFTB+MCM, and passed to the SP router of the Field Programmable Gate Array (FPGA) of the EFTB+MCM that determines whether the uplink is to be transferred via T5 propagation mode or T7 propagation mode. Uplink signals determined to be transmitted using T5 propagation mode are passed to the T5 uplink MCM, and via input SP1RX (DMA1) passed to the internal superpacket buffer in internal SRAM of the T5 uplink MCM. The signal can be buffered in external SRAM at external memory superpacket list nodes temporarily. The signal then passes to the transmit buffer 209×32 bits, to the internal SRAM uplink process, before passing to the output via input SP0TX (DMA2) to the uplink digital to analog converter at top right of FIG. 16.

Uplink signals determined to be transmitted using T7 propagation mode are passed to the T5 uplink MCM, and via input SP1RX (DMA1) passed to the internal superpacket buffer in internal SRAM of the T7 uplink MCM. The signal can be buffered in external SRAM at external memory superpacket list nodes temporarily. The signal then passes to the transmit buffer, to the internal SRAM uplink process, before passing to the output via input SP0TX (DMA2) to the uplink digital to analog converter at top left of FIG. 16.

Data flow may be uplinked (UL SP Data Flow) using a dual uplink EDTS 2.0. The uplink superpackets at about 4 Mbps may be generated in the EFTB 2.0 DSP at a rate of 125 Hz (or about twice as much as the EFTB rate (62.5 Hz)). These packets may be routed (based on buffer availability) to the T5 and T7 DSPs resulting in each FEDSP receiving the overall superpackets rate at approximately 62.5 Hz. Since each of the uplink DSPs operates with (roughly) the same data rate as standard EDTS, the acknowledgement of previously transmitted superpackets may be managed by supporting a downlink with double the 8.23 Hz acknowledgement rate of EDTS.

Data flow may be uplinked (UL SP Data Flow) using single mode EDTS 2.0. The UL superpackets at about 2 Mbps may be generated in the EFTB 2.0 DSP at a rate of 62.5 Hz. These packets may be sent to the T5 DSP. Since this DSP operates with the same data rate as EDTS, the acknowledgement of previously transmitted SP may be managed by supporting a DL at least the same 8.23 Hz acknowledgement rate of EDTS.

Data flow may be downlinked (DL SP Data Flow). In half duplex EDTS 2.0, a mode (T5) is used for downlink. A single-mode downlink transmission path may be supported either on the T5 or T7 DSP where the T5 mode would be selected as the default due to robustness against the common-mode noise.

Although a few example embodiments have been described in detail above, those skilled in the art will readily appreciate that many modifications are possible in the example embodiments without materially departing from this disclosure. Accordingly, such modifications are intended to be included within the scope of this disclosure as defined in the following claims. In the claims, means-plus-function clauses are intended to cover the structures described herein as performing the recited function and not simply structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method for discrete multi-tone, half duplex cable telemetry for a wellsite, comprising:
generating a first portion of a message unidirectionally or bi-directionally in a first cable propagation mode;
generating a second portion of a message unidirectionally or bi-directionally in a second cable propagation mode; and
transmitting the first and second portions of the message unidirectionally or bi-directionally over a cable operatively coupling a surface modem and a downhole modem sequentially in a plurality of time periods across a frequency bandwidth, the downhole modem being located downhole in a wellbore, wherein any bi-directional messages are separated by a guard period during which no message is transmitted on any cable propagation mode;
wherein the guard period is modified by exchanging known training sequences between the surface and the downhole modems and the modems are adjusted for a given cable length, cable type, channel response, and noise of the surface and downhole modems;
wherein a length of the guard period is determined based on one or more of: a length of the cable, a time interval sufficient for a cross-talk ECHO to dissipate, and a variable user input, so as to allow sufficient time for the residual energy caused by a message most recently transmitted, in a direction along the wellbore, to dissipate before another message, transmitted in the other direction along the wellbore, is received.

2. The method according to claim 1, wherein the cable comprises one of a heptacable, a monocable, a coaxial cable, a wired drill pipe conductor, and a slickline.

3. The method according to claim 2, wherein the first propagation mode comprises a T5 propagation mode.

4. The method according to claim 2, wherein the second cable propagation mode comprises a T2 or a T7 propagation mode.

5. The method according to claim 1, wherein the first portion of the message comprises a downlink and the second portion of the message comprises an uplink.

6. The method according to claim 1, wherein the selected frequency bandwidth can vary from 150 kHz to 250 kHz.

7. The method according to claim 1, wherein either uplink or downlink messages are modulated over a plurality of multiple frequency tones.

8. A system for discrete multi-tone, half duplex cable telemetry for a wellsite, comprising:
a surface modem that generates one or more downlink messages in a first propagation mode for transmission in a downhole direction;
one or more downhole tools that obtain measurements relating to at least one of borehole characteristics and formation characteristics, the one or more downhole tools coupled by a toolbus to a downhole modem, the downhole modem generating one or more uplink messages in the first propagation mode and in a second propagation mode for transmission in an uphole direction; and
a cable electrically coupling the surface modem and the downhole modem;
wherein the downlink and uplink messages are transmitted over the cable sequentially in a plurality of time periods across a single frequency bandwidth, wherein the downlink and uplink messages are separated from one another by a quiet time sample during which no message is transmitted in either the downhole or uphole direction;
wherein a length of the quiet time sample is modified by exchanging known training sequences between the surface and the downhole modems and the modems are adjusted for a given length of the cable, cable type, channel response, and noise of the surface and downhole modems.

9. The cable telemetry system according to claim 8, wherein the cable comprises one of a heptacable, a monocable, a coaxial cable, a wired drill pipe conductor, and a slickline.

10. The cable telemetry system according to claim 9, wherein the first propagation mode comprises T5 propagation mode.

11. The cable telemetry system according to claim 9, and wherein the second propagation mode comprises T2 or T7 propagation mode.

12. A system for discrete multi-tone, half duplex cable telemetry for a wellsite, comprising:
   a surface acquisition unit operatively coupling to a surface modem that generates one or more downlink messages in a first propagation mode for transmission in a downhole direction;
   a downhole modem that generates one or more uplink messages in the first cable propagation mode and in a second cable propagation mode for transmission in an uphole direction;
   a downhole toolstring comprising one or more downhole sensing tools that obtain measurements relating to at least one of borehole characteristics and formation characteristics, the downhole toolstring operatively coupled to the downhole modem via a toolbus; and
   a cable electrically coupling the surface modem and the downhole modem;
   wherein the downlink and uplink messages are transmitted sequentially in a plurality of time periods across a selected frequency bandwidth, wherein each of the downlink and uplink messages are separated from one another by a quiet time sample during which no message is transmitted in either the downhole direction or the uphole direction;
   wherein a length of the quiet time sample is modified by exchanging known training sequences between the surface and the downhole modems and the modems are adjusted for a given length of the cable, cable type, channel response, and noise of the surface and downhole modems.

13. The wellsite system according to claim 12, wherein the cable comprises one of a heptacable, a monocable, a coaxial cable, a wired drill pipe conductor, and a slickline.

14. The wellsite system according to claim 12, wherein the first propagation mode comprises T5 propagation mode.

15. The wellsite system according to claim 12, wherein the second propagation mode comprises T2 or T7 propagation mode.

16. The wellsite system according to claim 13, wherein the uplink and downlink exists in a single cable propagation mode.

17. The wellsite system according to claim 16, wherein bi-directional messages are separated with a pre-defined guard time.

* * * * *